Sept. 2, 1969    R. LOVELAND ETAL    3,464,595
LIQUID DISPENSING DEVICE
Filed Feb. 19, 1968    2 Sheets-Sheet 1

INVENTOR.
R. Loveland
G. Downie
BY
Glascock, Downing & Seebold
ATTORNEYS.

United States Patent Office 3,464,595
Patented Sept. 2, 1969

3,464,595
LIQUID DISPENSING DEVICE
Robert Loveland, Surrey, and George Downie, Sutton Coldfield, England, assignors to Gaskell & Chambers Limited, Shirley, Solihull, Warwickshire, England
Filed Feb. 19, 1968, Ser. No. 707,026
Int. Cl. G01f 11/04
U.S. Cl. 222—249                     4 Claims

ABSTRACT OF THE DISCLOSURE

A liquid dispensing device incorporating a cylinder, a free piston mounted in the cylinder, an inlet valve and an outlet valve at each end of the cylinder and cam means disposed externally of the cylinder at each thereof, the cam means being engageable with the valves which extend through cylinder end assemblies and being actuable so that the inlet valve at one end of the cylinder and the outlet valve at the other end of the cylinder can be opened so as in use to permit pressurised liquid to enter said one end of the cylinder and drive the piston towards the other end of the cylinder to expel through the open outlet valve liquid in front of the piston.

---

This invention relates to a liquid dispensing device which can be used, inter alia, for the dispensing of beer and other beverages where it is required that an accurate, predetermined volume of liquid should be dispensed when desired.

It is one object of the invention to provide such a device in an improved form and which is adapted for connection to a supply of pressurised liquid such as may be provided by a barrel of beer which is itself connected to means (such as a cylinder of compressed carbon dioxide) whereby pressure can be applied to the beer inside the barrel to force it from the barrel when required.

It is another object of the invention to provide a liquid dispensing device which is adapted to give an accurate measure when required but which will not leak when not in use notwithstanding that it remains connected to a supply of pressurised liquid.

It is also an object of the invention to provide a device in which dispensing of a predetermined quantity of liquid cannot be stopped until the whole quantity has been dispensed.

It is yet a further object of the invention to provide a liquid dispensing device which is relatively inexpensive to manufacture whilst being easy to operate.

Figure 1:
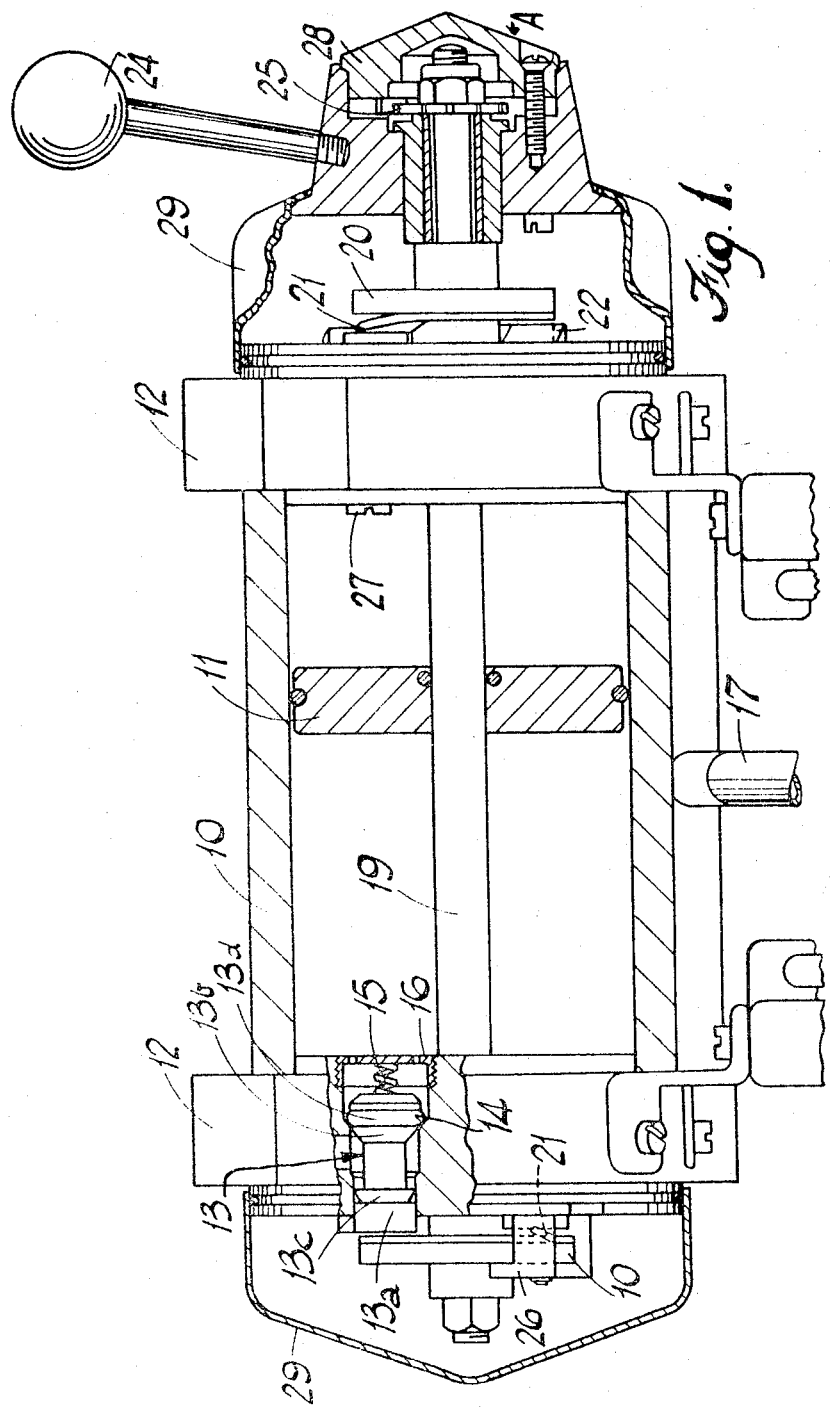
Figure 3:
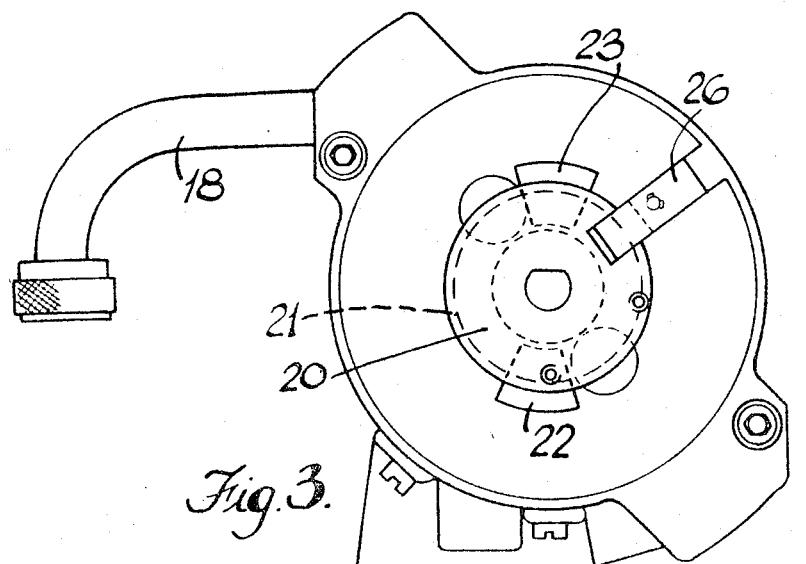
Figure 2:
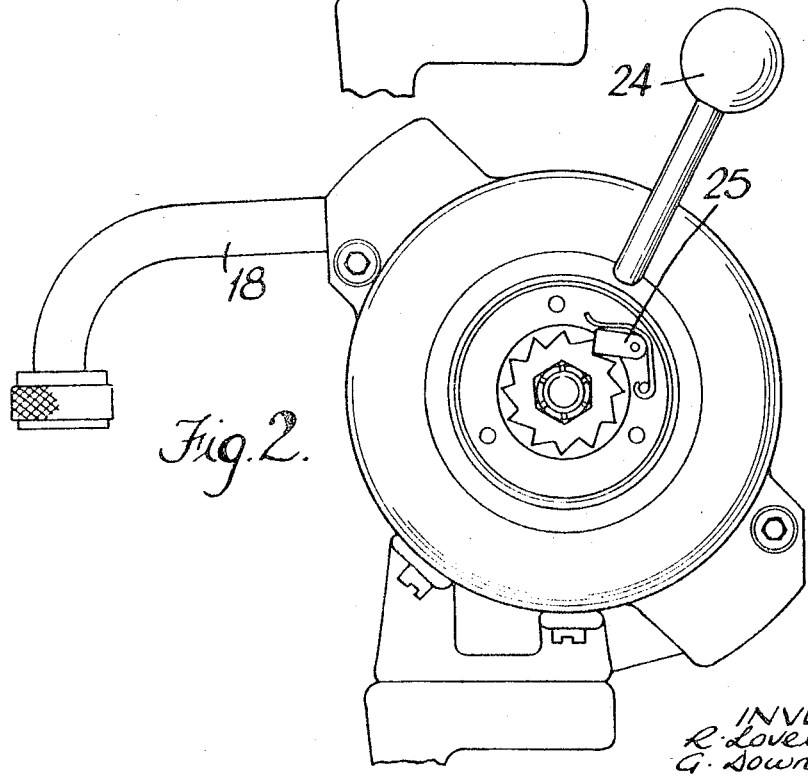

The invention will now be more particularly described with reference to the accompanying drawings wherein:

FIGURE 1 is a part sectional side elevation of one example of a liquid dispensing device constructed in accordance with the invention, FIGURE 2 is an end view looking in the direction of the arrow A in FIGURE 1, but with the end cap removed, and FIGURE 3 is an end view also looking in the direction of the arrow A but with the end cap, end cover and handle removed.

Referring to the drawings, the device shown therein comprises a cylinder 10 in which is mounted a free piston 11 for movement in the cylinder, the ends of which are closed by a pair of end assemblies 12 in each of which are mounted an inlet valve and an outlet valve arranged diametrically opposite to each other. The four valves thus provided are of identical construction and only one of the valves (indicated by reference numeral 13) is shown in FIGURE 1. Thus each valve has an axially outwardly directed stem 13a which extends through the end assembly in which it is mounted and a head portion 13b which co-operates with a seat 14. The valve has sealing elements 13c and 13d, and a spring 15 bearing at one end against an apertured plate 16 and at the other end against the head portion of the valve urges the valve towards its closed position in which it engages said seat 14.

The two inlet valves are connectible in use via a pipe 17 and passages or drillings (not shown for reasons of clarity) formed in the end assemblies 12 to a common supply of pressurised liquid which it is required to dispense and the two outlet valves are connectible by other passages (also not shown) to a common dispensing outlet 18. Thus if the inlet valve at one end of the cylinder is open and the outlet valve at the other end of the cylinder is open liquid will enter said one end of the cylinder to drive the piston towards the other end of the cylinder and expel liquid therefrom.

For the purpose of actuating said valves there is provided cam means comprising a pair of cam members disposed respectively on the axially outer sides of said end assemblies, said cam members being nonrotatably mounted on a spindle 19 which extends axially through the cylinder and end assemblies and on which the piston 11 can slide. Each of said cam members comprises a collar 20 and a resilient arcuate strip 21 secured at one end to the collar and being free at the other end and bent away from the collar to form a cam. Each of said cams can be engaged with either of the adpacent valve stems by rotation of the cam members to the appropriate position or which alternatively can be placed in a position in which neither valve stem is engaged. Moreover, at each end of the cylinder there is provided a pair of ramps 22 and 23 which serve to stress and guide the cams on to the ends of the valve stems as the cam members are rotated, the cams sliding off the ends of the ramps on to the valve stems. Said ramps also assist in preventing the cams from springing back off the valve stems after they have engaged said stems.

The device is also provided with a radially projecting manually operable handle 24 which is connected to said spindle 19 by means of a pawl and ratchet device 25 or a freewheel clutch device so that said handle is movable through an arc of 180°, the ends of the arc being defined by any convenient form of stops. In this case in order to effect, for example, two successive strokes of the piston the handle 24 will be moved in the appropriate angular direction to bring the two cams on the two cam members into the required angular position to open one inlet valve and one outlet valve. After the piston has completed its first stroke the handle then has to be taken back to the other end of its arc of travel (this movement having no effect on the spindle because of the aforementioned pawl and ratchet or freewheel device) and then again moved in the original angular direction to bring the two cam members into a position in which the cams engage the other inlet valve stem and the other outlet valve stem. In addition, latching means are provided at each end of the cylinder in order to prevent further actuation of the valve means until the piston has completed a stroke in either axial direction, said latching means comprising a catch 26 which is engageable with a radially extending slot formed in the outer face of the adjacent collar 20 to prevent further rotation of said collar until the catch is lifted out of the slot by engagement of the piston 11 with a stud 27 which projects into the cylinder and which is conected to said catch, said stud being urged axially inwardly by a spring (not shown). Thus as shown in FIGURE 1 and considering the piston to be moving to the right the valves cannot be reversed until the right hand side of the piston engages the stud 27 towards which it is travelling in order to disengage the associated catch from the slot into which it will have fallen when the same members were rotated to a position to start the piston moving to the right. The pawl and ratchet device 25 is enclosed by an end cap 28 and the cam means at each end of the cylinder by an end cover 29.

In the example above described there is only one cam at each end of the cylinder and this does of course provide a relatively inexpensive yet reliable construction. Moreover, the cam members can be set in a neutral position in which none of the valves is open. This means that in this position the cylinder will be cut off from the container from which the beverage is being dispensed so that no liquid pressure is exerted in the cylinder whilst the device is left standing so that the possibility of the occurrence of leaks is eliminated.

Having thus described our invention what we claim as new and desire to secure by Letters Patent is:

1. A liquid dispensing device comprising a cylinder, an end assembly at each end of the cylinder, a free piston mounted in the cylinder for relative axial movement therein, an inlet valve and an outlet valve mounted in each end assembly of the cylinder so as to extend through said assembly to the axially outer side thereof, said valves in each end assembly being diametrically opposite to each other relative to the axis of the cylinder, cam means disposed externally of the cylinder for opening said valves, said cam means comprising a pair of angularly movable cam members which are disposed respectively adjacent to the cylinder end assemblies on the axially outer sides thereof, each of said cam members having a single cam and being each movable in a constant angular direction, and resilient means for urging said valves towards a closed position, the inlet valves being connectible in use to a supply of pressurised liquid and the outlet valves to a dispensing outlet and the cam means being arranged to actuate said valves so that the inlet valve at one end of the cylinder and the outlet valve at the other end of the cylinder can be opened to admit pressurised liquid into said one end of the cylinder and on one side of the piston so as to effect movement of the piston in one axial direction to expel from the other end of the cylinder liquid on the other side of the piston, said cam means being actuable when desired and after the piston has completed a stroke in said one axial direction to effect movement of the piston in the opposite axial direction.

2. A liquid dispensing device as claimed in claim 1 wherein there is provided a spindle on which the cam members are nonrotatably mounted, a handle, and a pawl and ratchet device interconnecting the spindle and the handle, the latter being movable through a limited arc only so that it has to be moved back to its initial position after completion of one stroke of the piston before another stroke can be initiated.

3. A liquid dispensing device as calimed in claim 1 wherein each cam member comprises an arcuate strip of resilient material and a collar, one end of said strip being secured to the collar and the other end being free and being bent away from the collar.

4. A liquid dispensing device as claimed in claim 3 wherein there is provided at each end of the device a pair of ramps which are respectively disposed adjacent to the adjacent pair of valves and which serve to guide the free end of the associated resilient cam strip on to the ends of the valves when the cam member is rotated.

References Cited

UNITED STATES PATENTS 2,795,359  6/1957  Lehman _____ 222—249

FOREIGN PATENTS 1,334,266  6/1963  France.

ROBERT B. REEVES, Primary Examiner

H. S. LANE, Assistant Examiner